(12) United States Patent
Rajagopal et al.

(10) Patent No.: US 11,581,761 B2
(45) Date of Patent: Feb. 14, 2023

(54) TWO DEGREE-OF-FREEDOM SPHERICAL BRUSHLESS DC MOTOR

(71) Applicant: HONEYWELL INTERNATIONAL INC., Charlotte, NC (US)

(72) Inventors: Subhashree Rajagopal, Bangalore (IN); Pablo Bandera, Avondale, AZ (US); Govind Yadav, Bangalore (IN); Ramakrishna Rao P. V, Bangalore (IN); Sivanagamalleswara Bavisetti, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 275 days.

(21) Appl. No.: 17/092,451

(22) Filed: Nov. 9, 2020

(65) Prior Publication Data
US 2021/0242728 A1 Aug. 5, 2021

(30) Foreign Application Priority Data
Jan. 31, 2020 (IN) .............................. 202011004357

(51) Int. Cl.
*H02K 1/14* (2006.01)
*H02K 1/16* (2006.01)
(Continued)

(52) U.S. Cl.
CPC ............... *H02K 1/141* (2013.01); *H02K 1/02* (2013.01); *H02K 1/165* (2013.01); *H02K 1/276* (2013.01);
(Continued)

(58) Field of Classification Search
CPC .......... H02K 1/141; H02K 1/02; H02K 1/165; H02K 1/276; H02K 3/12; H02K 3/18;
(Continued)

(56) References Cited

U.S. PATENT DOCUMENTS 8,080,911 B2 * 12/2011 Won ....................... H02K 41/03
310/80
9,325,212 B2 * 4/2016 Tangudi ................... H02K 1/27
(Continued)

FOREIGN PATENT DOCUMENTS

CN 102570755 A 7/2012
DE 102017211119 A1 1/2019

*Primary Examiner* — Ahmed Elnakib
(74) *Attorney, Agent, or Firm* — Lorenz & Kopf, LLP

(57) ABSTRACT

A two degree-of-freedom brushless DC motor includes a stator, a rotor, a plurality of distributed stator windings, and a stator voice coil winding. The stator includes an inner stator structure and a plurality of arc-shaped stator poles. The inner stator structure includes a main body and a plurality of spokes that are spaced apart from each other to define a plurality of stator slots. Each arc-shaped stator pole is connected to a different one of the spokes. The rotor is spaced apart from the stator, includes a plurality of magnets, and is configured to rotate about a plurality of perpendicular axes. The distributed stator windings are wound around the plurality of spokes and extend through the stator slots. The stator voice coil winding is wound around the outer surfaces of the arc-shaped stator poles. The arc-shape and spacing of the stator poles define the stator as being spherically shaped.

20 Claims, 7 Drawing Sheets

(51) Int. Cl.
*H02K 1/276* (2022.01)
*H02K 3/28* (2006.01)
*H02K 3/18* (2006.01)
*H02K 1/02* (2006.01)
*H02K 41/03* (2006.01)
*H02K 3/12* (2006.01)

(52) U.S. Cl.
CPC ................ *H02K 3/12* (2013.01); *H02K 3/18* (2013.01); *H02K 3/28* (2013.01); *H02K 41/031* (2013.01); *H02K 2201/18* (2013.01)

(58) Field of Classification Search
CPC .... H02K 3/28; H02K 41/031; H02K 2201/18; H02K 1/146; H02K 1/2786; H02K 2213/03; H02K 7/08; H02K 29/00
USPC .................................................. 310/216.023
See application file for complete search history.

(56) References Cited

U.S. PATENT DOCUMENTS

| | | | |
|---|---|---|---|
| 10,326,348 B2* | 6/2019 | Bandera | H02K 41/031 |
| 2012/0133234 A1* | 5/2012 | Da Costa Balas Ferreira | H02K 21/26 |
| | | | 310/179 |
| 2017/0012482 A1* | 1/2017 | Bandera | H02K 1/27 |
| 2020/0274435 A1* | 8/2020 | Dai | H02K 1/2706 |
| 2020/0343804 A1* | 10/2020 | Mahajan | B64C 27/32 |
| 2021/0021187 A1* | 1/2021 | Mahajan | H01F 7/14 |
| 2021/0184521 A1* | 6/2021 | Rajagopal | H02K 1/185 |
| 2021/0234418 A1* | 7/2021 | Mahajan | H02K 21/12 |
| 2021/0234452 A1* | 7/2021 | P.V | H02K 21/16 |
| 2021/0242728 A1* | 8/2021 | Rajagopal | H02K 1/141 |
| 2021/0242739 A1* | 8/2021 | N | H02K 3/52 |

* cited by examiner

TWO DEGREE-OF-FREEDOM SPHERICAL BRUSHLESS DC MOTOR

CROSS REFERENCE TO RELATED APPLICATION

The present application claims benefit of prior filed Indian Provisional Patent Application No. 202011004357, filed Jan. 31, 2020, which is hereby incorporated by reference herein in its entirety.

TECHNICAL FIELD

The present invention generally relates to spherical motors, and more particularly relates to a two degree-of-freedom brushless direct current (DC) motor.

BACKGROUND

Recent developments in the field of UAV (Unmanned Aerial Vehicles), drones for unmanned air transport, robotics, office automation, and intelligent flexible manufacturing and assembly systems have necessitated the development of precision actuation systems with multiple degrees of freedom (DOF). Conventionally, applications that rely on multiple (DOF) motion have typically done so by using a separate motor/actuator for each axis, which results in complicated transmission systems and relatively heavy structures.

With the advent of spherical motors, there have been multiple attempts to replace the complicated multi-DOF assembly with a single spherical motor assembly. A typical spherical motor consists of a central sphere on which coils are wound, which may be orthogonally placed from each other. The sphere is surrounded by multi-pole magnets in the form of an open cylinder. The coil assembly is held axially and maintained in a vertical position via, for example, a metal post. The outer cylinder is held by a yoke/frame via a bearing, which allows the cylinder to be rotatable about its axis. The yoke is further connected to the metal post of the coil assembly via a second bearing, which allows the yoke, along with the cylinder, to be rotatable about one or two additional axes.

Unfortunately, current attempts to apply the spherical motor to the certain applications, such as UAVs and robotics, have led to several spherical motor design concepts. Unfortunately, many of these design concepts suffer certain drawbacks. For example, many exhibit relatively limited torque. This is due, at least in part, to a relatively large air gap between the magnets and inner spherical stator (due in part to the windings) and a relatively heavy spherical stator. The current concepts also exhibit relatively high winding temperatures, relatively complicated and time-consuming winding patterns, Hence, there is a need for a spherical motor that at least exhibits improved generated torque, improved thermal handling capabilities, improved speed range, and simpler coil winding configurations as compared to presently known spherical motors. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a two degree-of-freedom brushless DC motor includes a stator, a rotor, a plurality of distributed stator windings, and a stator voice coil winding. The stator includes an inner stator structure and a plurality of arc-shaped stator poles. The inner stator structure includes a main body and a plurality of spokes extending radially outwardly from the main body. The spokes are spaced apart from each other to define a plurality of stator slots. Each arc-shaped stator pole has an inner surface and an outer surface, and each arc-shaped stator pole is connected to a different one of the spokes. The rotor is spaced apart from, and at least partially surrounds, the stator. The rotor includes a plurality of magnets and is configured to rotate about a plurality of perpendicular axes. The distributed stator windings are wound around the plurality of spokes and extend through the stator slots. The stator voice coil winding is wound onto and around the outer surfaces of the arc-shaped stator poles. The arc-shape and spacing of the stator poles define the stator as being spherically shaped.

In another embodiment, a two degree-of-freedom brushless DC motor includes a rotor, a stator, a plurality of distributed stator windings, and a stator voice coil winding. The rotor includes a plurality of magnets and is configured to rotate about a plurality of perpendicular axes. The stator is spaced apart from, and at least partially surrounds, the rotor. The stator includes an outer stator structure and a plurality of arc-shaped stator poles. The outer stator structure includes a main body and a plurality of spokes extending radially inwardly from the main body. The spokes are spaced apart from each other to define a plurality of stator slots. Each arc-shaped stator pole has an inner surface and an outer surface, and each arc-shaped stator pole is connected to a different one of the spokes. The distributed stator windings are wound around the plurality of spokes and extend through the stator slots. The stator voice coil winding is wound onto and around the outer surfaces of the arc-shaped stator poles. The arc-shape and spacing of the stator poles define a spherical shape.

Furthermore, other desirable features and characteristics of the two degree-of-freedom brushless DC motor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
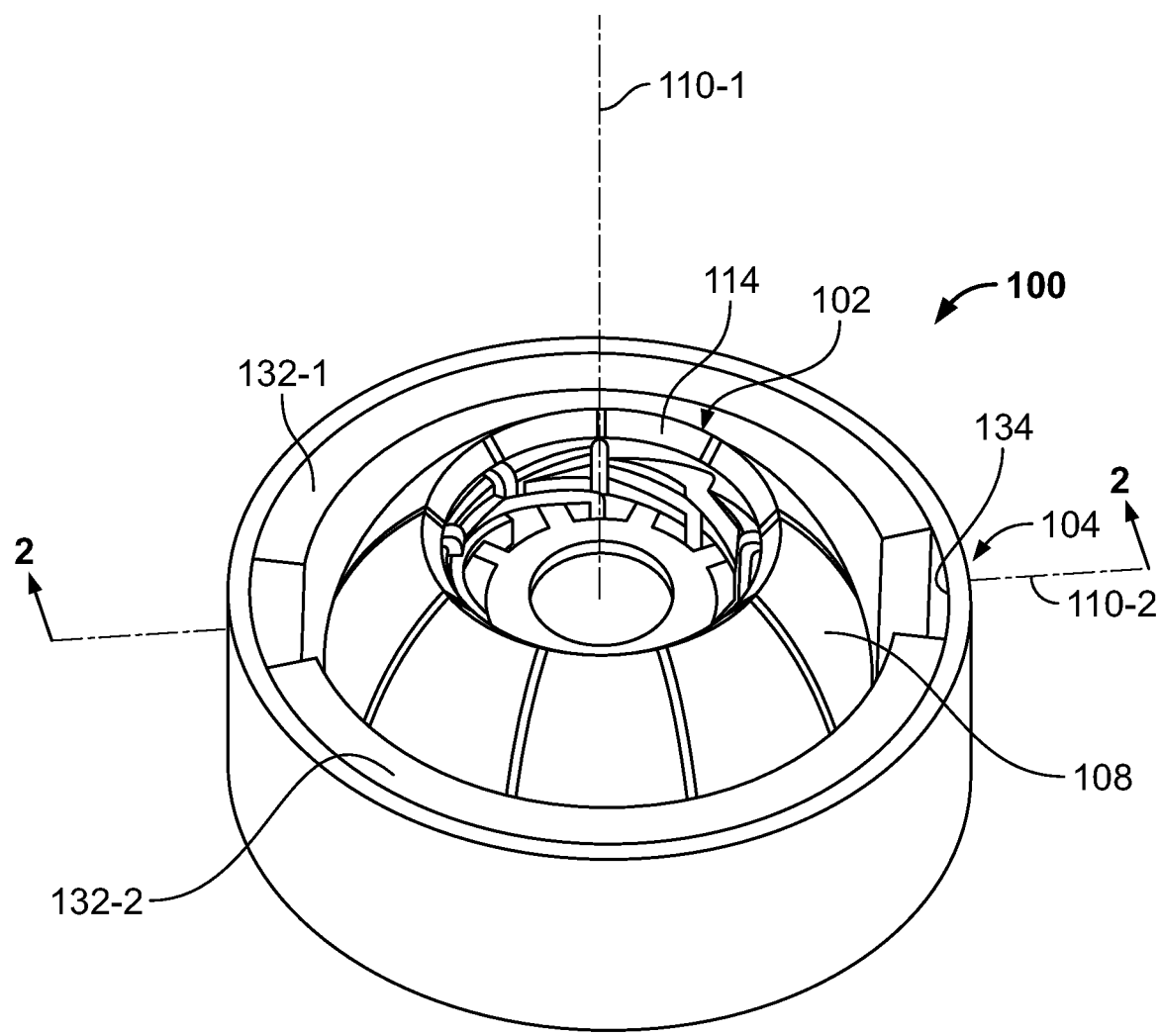
FIG. 1 depicts a plan view of one embodiment of a two degree-of-freedom brushless direct current (BLDC)
Figure 2:
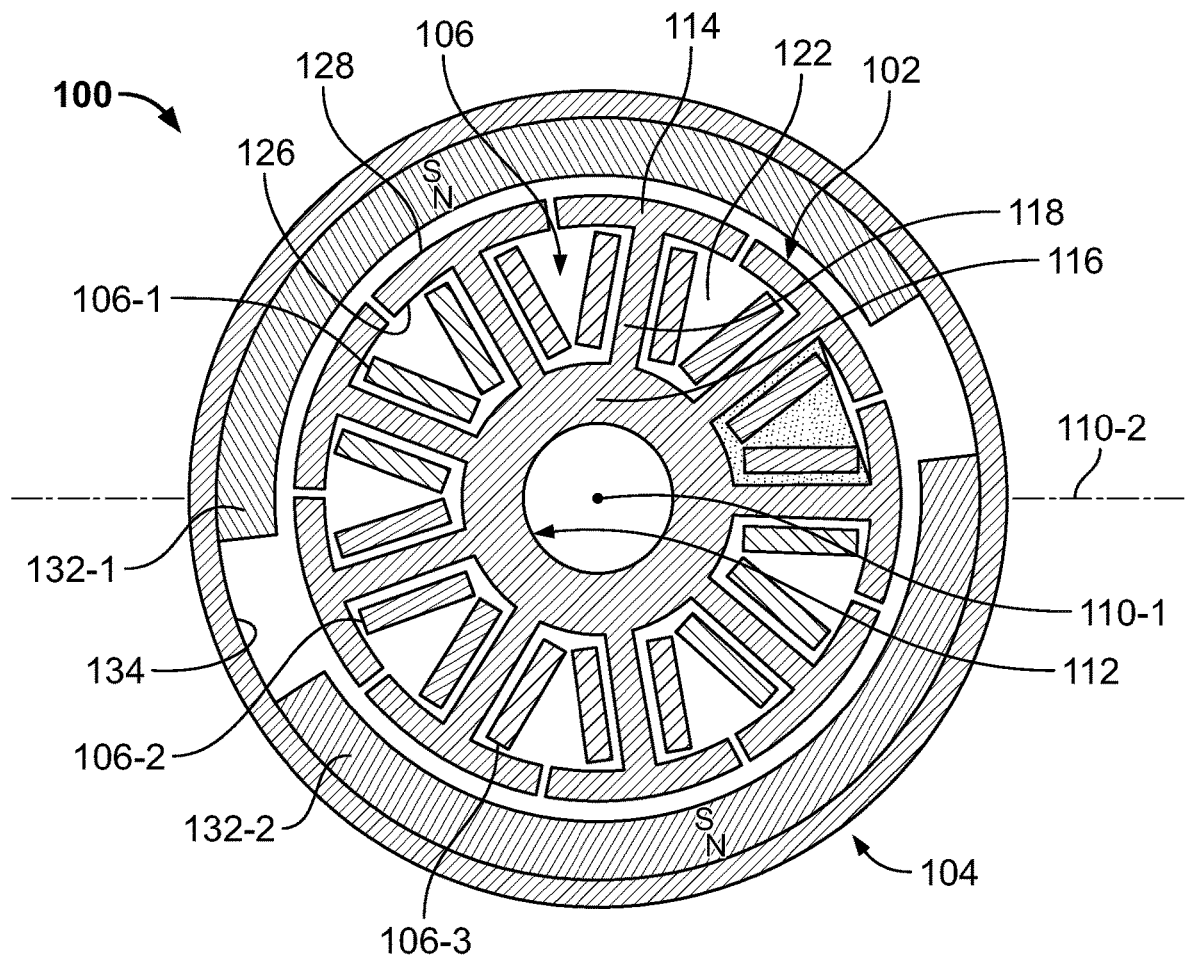
FIG. 2 depicts a cross section view, taken along line 2-2 in FIG. 1, of the motor of FIG. 1.

Referring to FIGS. 1 and 2, a plan view and a cross sectional view, respectively, of one example embodiment of a two degree-of-freedom brushless direct current (BLDC) spherical motor 100 is depicted. The depicted motor 100 includes a stator 102, a rotor 104, a plurality of distributed stator windings 106, and a stator voice coil winding 108.

As shown most clearly in FIG. 1, the stator 102 includes an inner stator structure 112 and a plurality of arc-shaped stator poles 114. The inner stator structure 112 includes a main body 116 and a plurality of spokes 118. The spokes 118 extend radially outwardly from the main body 116 and are spaced apart from each other to define a plurality of stator slots 122. Each of the arc-shaped stator poles 114 is connected to a different one of the spokes 118, and each has an inner surface 126 and an outer surface 128. As FIG. 1 depicts, the arc-shape and spacing of the stator poles 114 define the shape of the stator 102 as being spherical. In the depicted embodiment, it is seen that stator 102 includes nine arc-shaped stator poles 114 and thus nine stator slots 122. It will be appreciated, however, that the number of stator poles 114 and stator slots 122 may vary and may be greater than or less than this number.

Figure 3:
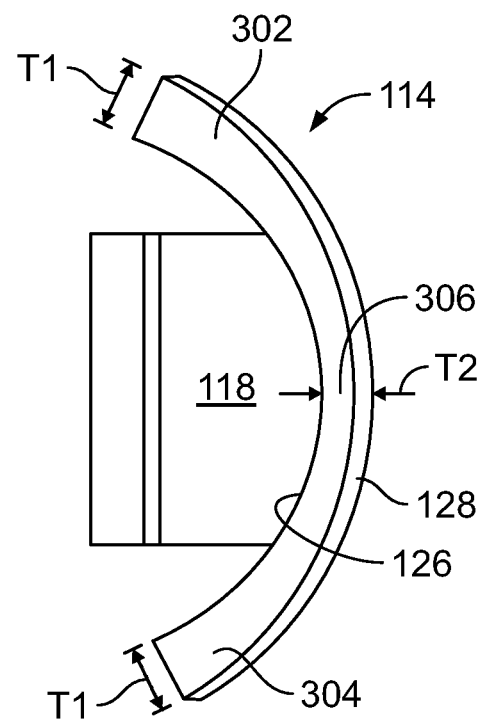
FIG. 3 depicts an embodiment of an arc-shaped stator pole that may be used in the motor of FIGS. 1 and 2.

Each arc-shaped stator pole 114, an embodiment of which is depicted in FIG. 3, has a first end portion 302, a second end portion 304, and a central end portion 306 disposed between the first and second end portions 302, 304, which is where the spoke 118 is connected. The first and second end portion 302, 304 each have a first thickness (T1) defined between the inner surface 126 and the outer surface 128, and the central portion 306 has a second thickness (T2) defined between the inner surface 126 and the outer surface 128. In the depicted embodiment, the first thickness (T1) is greater than the second thickness (T2). This variation in thickness improves torque ripple and minimizes detent torque. It will be appreciated that in other embodiments each arc-shaped stator pole 114 may having a uniform thickness throughout.

The stator 102 may be constructed as a unitary structure or from two or more structures. In the depicted embodiment, however, the stator 102 is formed as a unitary structure. The stator 102 is also formed of a magnetically permeable material, which provides a low reluctance path for the magnetic flux that is generated when the coils (described momentarily) are electrically energized. The magnetically permeable material may be, for example, relatively soft magnetic solid material, steel stampings/laminations, and molds made up of soft iron powder and/or composites, just to name a few.

The rotor 104 is spaced apart from, and at least partially surrounds, the spherical stator 102. The rotor 104 comprises a plurality of magnets 132 and is mounted to rotate about a plurality of perpendicular axes. In the depicted embodiment, and as FIGS. 1 and 2 depict, the rotor 104 is mounted to rotate about two perpendicular axes—a first rotational axis 110-1 and a second rotational axis 110-2. In other embodiments, however, the rotor 104 could be mounted to rotate about a third rotational axis. The rotor 104 preferably comprises a magnetically permeable material such as, for example, relatively soft magnetic solid material, steel stampings/laminations, and molds made up of soft iron powder and/or composites, just to name a few.

The magnets 132 may be formed as an integral part of the rotor 104 or may be formed separately from the rotor 104. In the embodiment depicted in FIGS. 1 and 2, the magnets 132 are formed separately from the rotor 104. The magnets 132, which include a first magnet 132-1 and a second magnet 132-2, are coupled to, and extend radially inwardly from, an inner surface 134 of the rotor 104. Moreover, each magnet 132 is disposed such that at least one of its magnetic poles faces the stator 102. It will be appreciated that the magnets 132 may be variously shaped and dimensioned and may be variously disposed. For example, in the depicted embodiment the magnets 132 are generally arc-shaped, but in other embodiments the magnets 132 may be semi-spherically shaped, or any one of numerous other shapes if needed or desired. It will additionally be appreciated that the arc length of the magnets 132 may be varied. Moreover, while the portion of the magnets 132 that face the stator 102 are preferably, for efficiency, contoured similar to the stator 102, these portions need not be so contoured.

Figure 4:
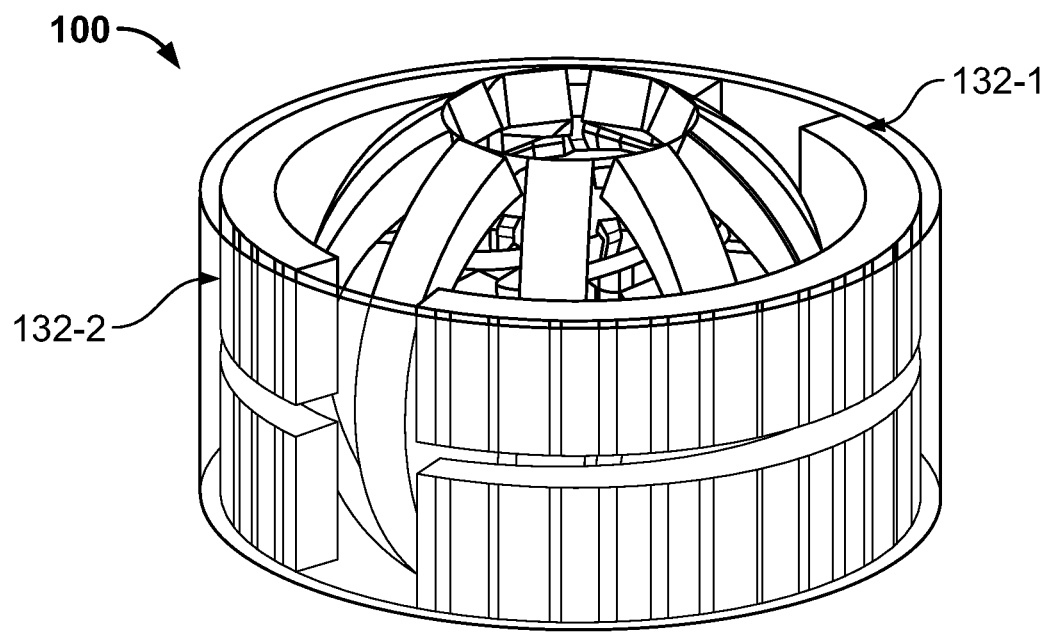
FIG. 4 depicts a plan view of another embodiment of a two degree-of-freedom brushless direct current (BLDC)
Figure 5:
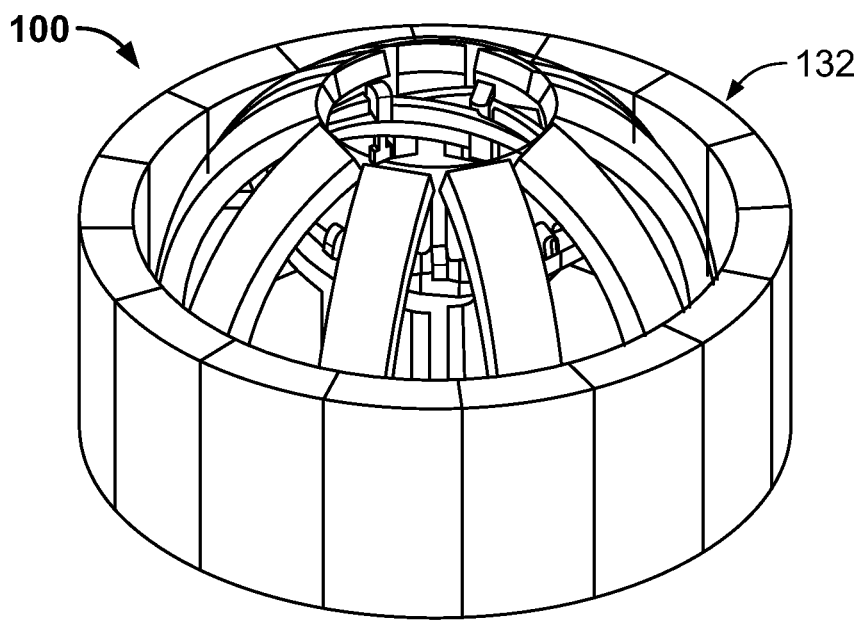
FIG. 5 depicts a plan view of another embodiment of a two degree-of-freedom brushless direct current (BLDC)

Each magnet 132 emanates a magnetic field, and each is preferably arranged such that the polarity of the first magnet 132-1 relative to the stator 102 is opposite to the polarity of the second magnet 132-2. For example, in the depicted embodiment, the north pole (N) of the first magnet 132-1 is disposed closer to the stator 102, whereas the south pole (S) of the second magnet 132-2 is disposed closer to the stator 102. The magnets 132 are disposed such that the magnetic pole facing the stator 102 is spaced apart therefrom by a predetermined gap. The gap is preferably small enough to minimize losses, which increases the magnetic efficiency by reducing magnetic reluctance. It will be appreciated that the magnets 132 may be variously implemented. For example, each magnet 132 may be implemented as two or more split magnets, as depicted in FIG. 4, or as a Halbach array, as depicted in FIG. 5.

Returning to FIGS. 1 and 2, and as was noted above, the motor 100 additionally includes two sets of windings—distributed stator windings 106 and a stator voice coil winding 108. The distributed stator windings 106 are wound around the spokes 118 and extend through the stator slots 122 and may be wound in either concentrated or distributed fashion within these slots 122. The stator voice coil winding 108 is wound onto and around the outer surfaces 128 of the arc-shaped stator poles 114. In the depicted embodiment, it is noted that the distributed stator windings 106 are implemented as 3-phase windings, and thus include a first stator winding 106-1, a second stator winding 106-2, and a third stator winding 106-3. In other embodiments, however, the distributed stator windings 106 may be implemented with N-number of phases, where N is an integer greater than or less than three.

Figure 6:
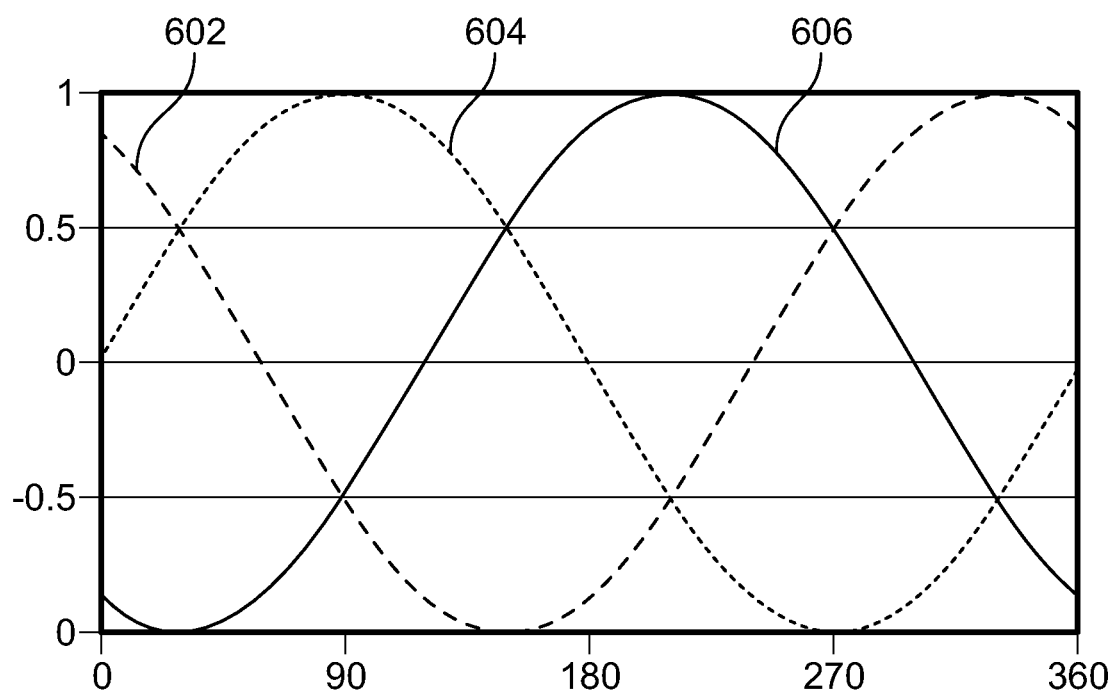
FIG. 6 depicts an example of three alternating current voltages that may be used to energize a portion of the motors depicted in FIGS. 1, 2, 4, and 5.

Regardless of the number of phases, the distributed stator windings 106, when energized, are used for spinning the rotor 104 relative to the stator 102, and the stator voice coil winding 108, when energized, is used for tilting the rotor 104 relative to the stator 102. That is, when the distributed stator windings 106 are energized with alternating current (AC) voltages, a Lorentz force is generated between the distributed stator windings 106 and the magnets 132, which in turn imparts a torque to the rotor 104 that causes it to rotate, relative to the stator 102, about the first rotational axis 110-1 (e.g., spin axis). When the stator voice coil winding 106 is energized with an AC voltage, a Lorentz force is generated between the stator voice coil winding 108 and the magnets 132, which imparts a torque to the rotor 104 that causes it to rotate, relative to the stator 102, about the second rotational axis 110-2 (e.g., tilt axis). Preferably, and as FIG. 6 illustrates, the first stator winding 106-1, the second stator winding 106-2, and the third stator winding 106-3 are energized with a first AC voltage 602, a second AC voltage 604, and a third AC voltage 606, respectively, and the first, second, and third 606 AC voltages 602, 604, 606 are 120-degrees ($2\pi/3$ radians) out of phase with each other.

In the above-described embodiment, the motor 100 is configured with the rotor 104 surrounding (or at least partially surrounding) the stator 102. Such a configuration may be referred to as an "out-runner" configuration. In another embodiment, which may be referred to as an "in-runner" configuration, the stator surrounds (or at least partially surrounds) the rotor. Such an embodiment is depicted in FIGS. 7 and 8 and with reference thereto will now be described.

Figure 7:
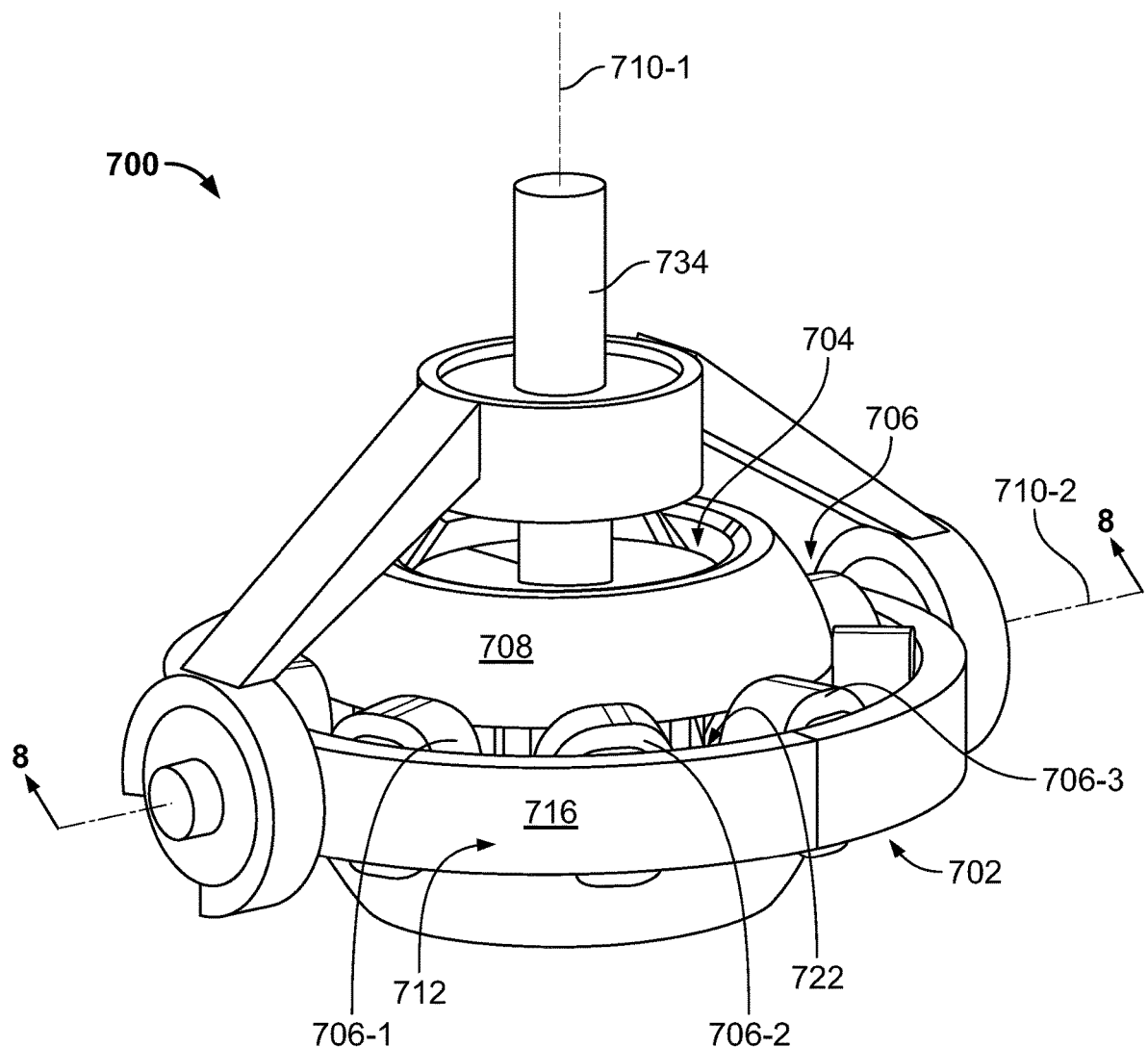
FIG. 7 depicts a plan view of another embodiment of a two degree-of-freedom brushless direct current (BLDC)
Figure 8:
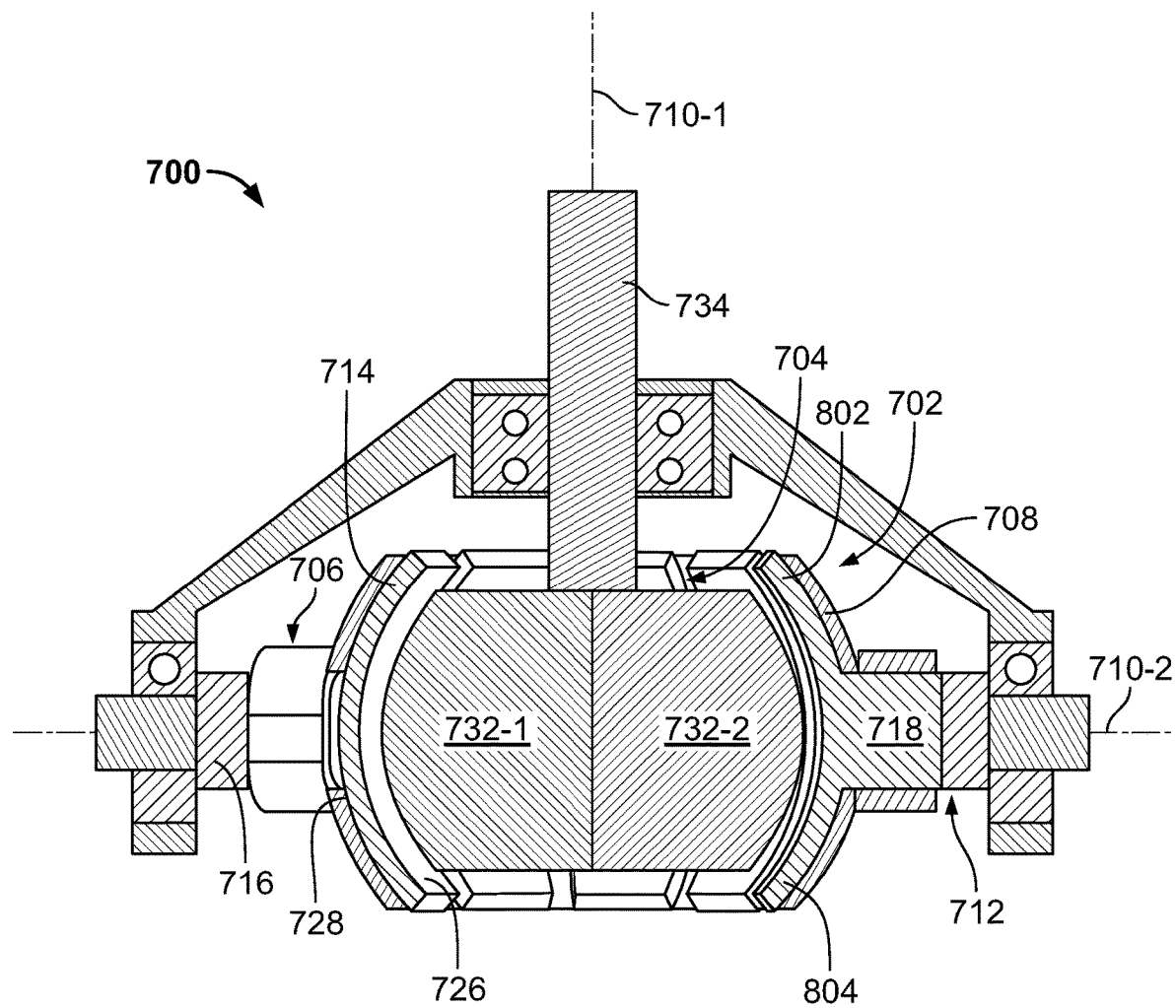
FIG. 8 depicts a cross section view, taken along line 8-8 in FIG. 7, of the motor of FIG. 7.

The motor 700 depicted in FIGS. 7 and 8 also includes a stator 702, a rotor 704, a plurality of distributed stator windings 706, and a stator voice coil winding 708. In this embodiment, however, the stator 702 is spaced apart from, and at least partially surrounds, the rotor 704. The stator 704 in this embodiment includes an outer stator structure 712 and a plurality of arc-shaped stator poles 714. The outer stator structure 712 includes a main body 716 and a plurality of spokes 718. The spokes 718 extend radially inwardly from the main body 716 and are spaced apart from each other to define a plurality of stator slots 722. Each of the arc-shaped stator poles 714 is connected to a different one of the spokes 718, and each has an inner surface 726 and an outer surface 728. As FIGS. 7 and 8 depict, the arc-shape and spacing of the stator poles 714 define the shape of at least a portion of the stator 702 as being spherical. In the depicted embodiment, the stator 702 includes nine arc-shaped stator poles 714 and thus nine stator slots 722. It will be appreciated, however, that the number of stator poles 714 and stator slots 722 may vary and may be greater than or less than this number.

Preferably, though certainly not necessarily, the arc-shaped stator poles 714 are shaped similar to those in the embodiment depicted in FIGS. 1 and 2. That is, the first and second end portions 802, 804 each have a first thickness (T1) defined between the inner surface 726 and the outer surface 728, and the central portion 806 has a second thickness (T2) defined between the inner surface 726 and the outer surface 728, and the first thickness (T1) is greater than the second thickness (T2). This variation in thickness improves torque ripple and minimizes detent torque. It will be appreciated that in other embodiments each arc-shaped stator pole 714 may having a uniform thickness throughout.

The stator 702 may be constructed as a unitary structure or from two or more structures. In the depicted embodiment, however, the stator 702 is formed as a unitary structure. The stator 702 is also formed of a magnetically permeable material, which provides a low reluctance path for the magnetic flux that is generated when the coils (described momentarily) are electrically energized. The magnetically permeable material may be, for example, relatively soft magnetic solid material, steel stampings/laminations, and molds made up of soft iron powder and/or composites, just to name a few.

The rotor 704 comprises a plurality of magnets 732 and is mounted to rotate about a plurality of perpendicular axes. In the depicted embodiment, as shown most clearly in FIG. 8, the rotor 704 is mounted to rotate about two perpendicular axes—a first rotational axis 810-1 and a second rotational axis 810-2. In other embodiments, however, the rotor 704 could be mounted to rotate about a third rotational axis. The rotor 704 preferably comprises a magnetically permeable material such as, for example, relatively soft magnetic solid material, steel stampings/laminations, and molds made up of soft iron powder and/or composites, just to name a few.

The magnets 732 may be formed as an integral part of the rotor 104 or may be formed separately from the rotor 104. In the embodiment depicted in FIGS. 7 and 8, the magnets 132 are formed as an integral part of the rotor 704. The magnets 732, which include a first magnet 732-1 and a second magnet 732-2, are coupled to, and extend radially outwardly from, a shaft 734. Moreover, each magnet 732 is disposed such that at least one of its magnetic poles faces the stator 704. It will be appreciated that the magnets 732 may be variously shaped and dimensioned and may be variously disposed. For example, in the depicted embodiment the magnets 732 are generally arc-shaped, but in other embodiments the magnets 732 may be semi-spherically shaped, or any one of numerous other shapes if needed or desired. It will additionally be appreciated that the arc length of the magnets 732 may be varied. Moreover, while the portion of the magnets 732 that face the stator 102 are preferably, for efficiency, contoured similar to the stator 702, these portions need not be so contoured.

Each magnet 732 emanates a magnetic field, and each is preferably arranged such that the polarity of the first magnet 732-1 relative to the stator 702 is opposite to the polarity of the second magnet 732-2. For example, in the depicted embodiment, the north pole (N) of the first magnet 732-1 is disposed closer to the stator 702, whereas the south pole (S) of the second magnet 732-2 is disposed closer to the stator 702. The magnets 732 are disposed such that the magnetic pole facing the stator 702 is spaced apart therefrom by a predetermined gap. The gap is preferably small enough to minimize losses, which increases the magnetic efficiency by reducing magnetic reluctance. It will be appreciated that the magnets 132 may be variously implemented. For example, each magnet 732 may be implemented as two or more split magnets, similar to the embodiment depicted in FIG. 4, or as a Halbach array, similar to the embodiment depicted in FIG. 5.

As with the previously described embodiment, the distributed stator windings 706 are wound around the spokes 718 and extend through the stator slots 722 and may be wound in either concentrated or distributed fashion within these slots 722. The stator voice coil winding 708 is wound onto and around the outer surfaces 728 of the arc-shaped stator poles 714. In the depicted embodiment, it is noted that the distributed stator windings 706 are implemented as 3-phase windings, and thus include a first stator winding 706-1, a second stator winding 706-2, and a third stator winding 706-3. In other embodiments, however, the distributed stator windings 706 may be implemented with N-number of phases, where N is an integer greater than or less than three.

Regardless of the number of phases, the distributed stator windings 706, when energized, are used for spinning the rotor 704 relative to the stator 702, and the stator voice coil winding 708, when energized, is used for tilting the rotor 704 relative to the stator 702. That is, when the distributed stator windings 706 are energized with alternating current (AC) voltages, a Lorentz force is generated between the distributed stator windings 706 and the magnets 732, which in turn imparts a torque to the rotor 704 that causes it to rotate, relative to the stator 702, about the first rotational axis 710-1 (e.g., spin axis). When the stator voice coil winding 706 is energized with an AC voltage, a Lorentz force is generated between the stator voice coil winding 708 and the magnets 732, which imparts a torque to the rotor 704 that causes it to rotate, relative to the stator 702, about the second rotational axis 710-2 (e.g., tilt axis). Preferably, as with the previously described embodiment, the first stator winding 706-1, the second stator winding 706-2, and the third stator winding 706-3 are energized with a first AC voltage 602, a second AC voltage 604, and a third AC voltage 606, respectively, and the first, second, and third 606 AC voltages 602, 604, 606 are 120-degrees (2π/3 radians) out of phase with each other.

Figure 9:
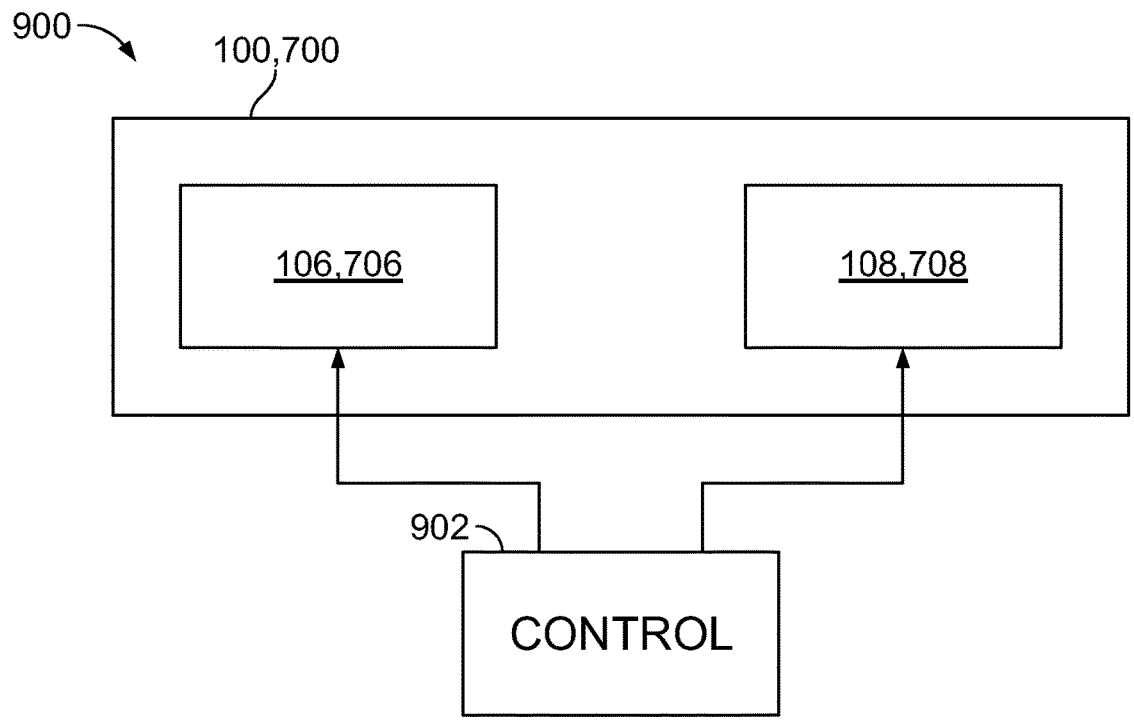
FIG. 9 depicts a functional block diagram of a two degree-of-freedom control system.

Referring now to FIG. 9, a functional block diagram of a multi-degree of freedom motor control system 900 that includes the motor 100 of FIGS. 1 and 2 or the motor of FIGS. 7 and 8 is depicted. As FIG. 9 depicts, the system 900 includes a control 902 that is coupled to each of the distributed stator windings 106, 706 (e.g., the first stator winding 106-1, 706-1, the second stator winding 106-2, 706-2, and the third stator winding 106-3, 706-3) and to the stator voice coil winding 108, 708. The control 902 is configured to control the current magnitudes and directions in the distributed stator windings 106, 706 and the stator voice coil winding 108, 708 to thereby control the rotational speed and direction of the rotor 104, 704. The control 902 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 902. Some non-limiting examples of suitable control techniques include PWM control and back EMF control.

Figure 10:
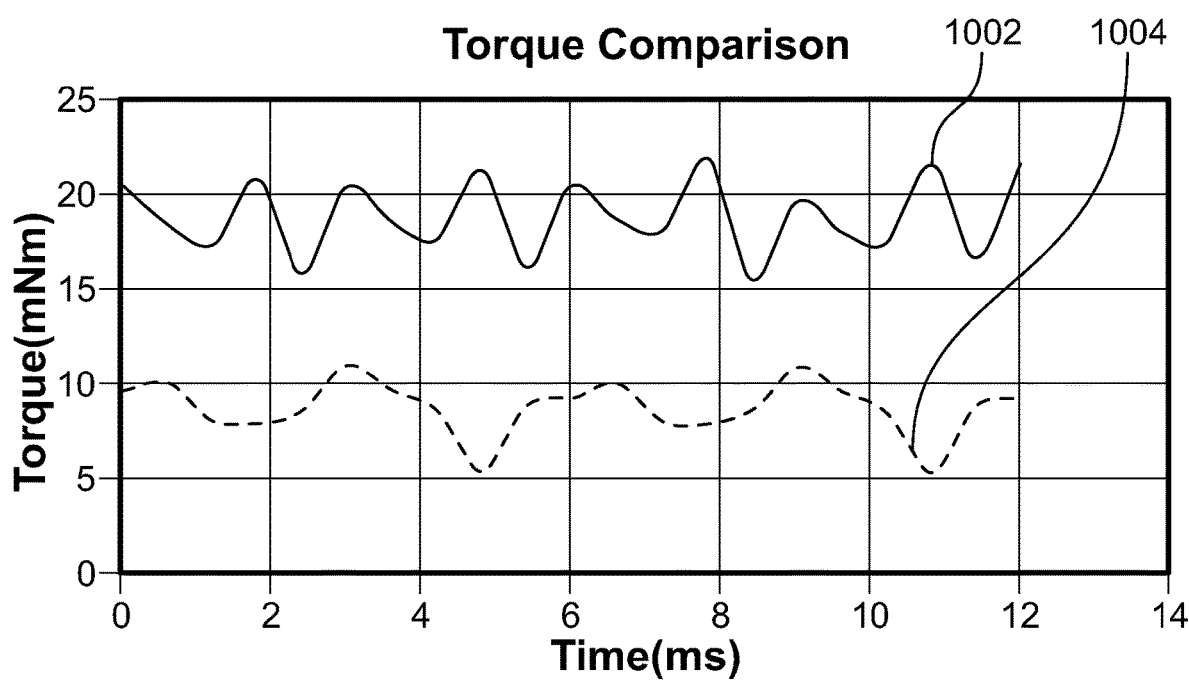
FIG. 10 graphically depicts a comparison of torque generated by a currently known spherical motor and an embodiment of a two degree-of-freedom motor.

The spherical motor embodiments disclosed herein exhibit several advantages over many presently known spherical motors. One advantage is a volumetric advantage, whereby the multi-stage configuration enables high power density spherical motor construction in a relatively small space envelope. The multi-stage spherical motor embodiments have less parts, thereby increasing overall reliability. The multi-stage spherical motor embodiments also exhibit relatively higher torque. For example, as FIG. 10 depicts, the multi-stage spherical motor embodiments 1002 can deliver approximately 2.0 times that of presently known configurations 1004.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, magnetically electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A two degree-of-freedom brushless DC motor, comprising:
   a stator comprising an inner stator structure and a plurality of arc-shaped stator poles, the inner stator structure comprising a main body and a plurality of spokes extending radially outwardly from the main body, the spokes spaced apart from each other to define a plurality of stator slots, each arc-shaped stator pole having an inner surface and an outer surface, each arc-shaped stator pole connected to a different one of the spokes;
   a rotor spaced apart from, and at least partially surrounding, the stator, the rotor comprising a plurality of magnets and configured to rotate about a plurality of perpendicular axes;
   a plurality of distributed stator windings wound around the plurality of spokes and extending through the stator slots; and
   a stator voice coil winding wound onto and around the outer surfaces of the arc-shaped stator poles,
   wherein the arc-shape and spacing of the stator poles define the stator as being spherically shaped.

2. The motor of claim 1, wherein the plurality of distributed stator windings comprises a first stator winding, a second stator winding, and a third stator winding.

3. The motor of claim 1, wherein:
   the plurality of distributed stator windings, when electrically energized, impart a torque on the rotor that causes the rotor to rotate, relative to the stator, about a first rotational axis; and
   the stator voice coil, when electrically energized, imparts a torque on the rotor that causes the rotor to rotate, relative to the stator, about a second rotational axis that is perpendicular to the first rotational axis.

4. The motor of claim 1, wherein the stator comprises nine arc-shaped stator poles and nine stator slots.

5. The motor of claim 1, wherein:
each arc-shaped stator pole has a first end portion, a second end portion, and a central end portion disposed between the first and second end portions;
the first end portion and the second end portion of each arc-shaped stator pole has a first thickness defined between the inner surface and the outer surface;
the central portion of each arc-shaped stator pole has a second thickness defined between the inner surface and the outer surface; and
the first thickness is greater than the second thickness.

6. The motor of claim 1, further comprising:
a control coupled to the plurality of distributed stator windings and to the stator voice coil winding, the control configured to control current magnitudes in the plurality of distributed stator windings and in the stator voice coil winding to thereby control rotation of the rotor.

7. The motor of claim 6, wherein the control is configured to supply the distributed stator windings and the stator voice coil winding with alternating current (AC) voltages.

8. The motor of claim 7, wherein:
the distributed stator windings comprise a first stator winding, a second stator winding, and a third stator winding;
the control is configured to supply the first stator winding, the second stator winding, and the third stator winding with a first AC voltage, a second AC voltage, and a third AC voltage, respectively; and
the first, second, and third AC voltages are 120-degrees ($2\pi/3$ radians) out of phase with each other.

9. The motor of claim 1, wherein the spherical stator comprises a magnetically permeable material.

10. The motor of claim 1, wherein the rotor comprises a magnetically permeable material.

11. A two degree-of-freedom brushless DC motor, comprising:
a rotor comprising a plurality of magnets and configured to rotate about a plurality of perpendicular axes;
a stator spaced apart from, and at least partially surrounding, the rotor, the stator comprising an outer stator structure and a plurality of arc-shaped stator poles, the outer stator structure comprising a main body and a plurality of spokes extending radially inwardly from the main body, the spokes spaced apart from each other to define a plurality of stator slots, each arc-shaped stator pole having an inner surface and an outer surface, each arc-shaped stator pole connected to a different one of the spokes;
a plurality of distributed stator windings wound around the plurality of spokes and extending through the stator slots; and
a stator voice coil winding wound onto and around the outer surfaces of the arc-shaped stator poles,
wherein the arc-shape and spacing of the stator poles define a spherical shape.

12. The motor of claim 11, wherein the plurality of distributed stator windings comprises a first stator winding, a second stator winding, and a third stator winding.

13. The motor of claim 11, wherein:
the plurality of distributed stator windings, when electrically energized, impart a torque on the rotor that causes the rotor to rotate, relative to the stator, about a first rotational axis; and
the stator voice coil, when electrically energized, imparts a torque on the rotor that causes the rotor to rotate, relative to the stator, about a second rotational axis that is perpendicular to the first rotational axis.

14. The motor of claim 11, wherein the stator comprises nine arc-shaped stator poles and nine stator slots.

15. The motor of claim 11, wherein:
each arc-shaped stator pole has a first end portion, a second end portion, and a central end portion disposed between the first and second end portions;
the first end portion and the second end portion of each arc-shaped stator pole has a first thickness defined between the inner surface and the outer surface;
the central portion of each arc-shaped stator pole has a second thickness defined between the inner surface and the outer surface; and
the first thickness is greater than the second thickness.

16. The motor of claim 11, further comprising:
a control coupled to the plurality of distributed stator windings and to the stator voice coil winding, the control configured to control current magnitudes in the plurality of distributed stator windings and in the stator voice coil winding to thereby control rotation of the rotor.

17. The motor of claim 16, wherein the control is configured to supply the distributed stator windings and the stator voice coil winding with alternating current (AC) voltages.

18. The motor of claim 17, wherein:
the distributed stator windings comprise a first stator winding, a second stator winding, and a third stator winding;
the control is configured to supply the first stator winding, the second stator winding, and the third stator winding with a first AC voltage, a second AC voltage, and a third AC voltage, respectively; and
the first, second, and third AC voltages are 120-degrees ($2\pi/3$ radians) out of phase with each other.

19. The motor of claim 11, wherein the spherical stator comprises a magnetically permeable material.

20. The motor of claim 11, wherein the rotor comprises a magnetically permeable material.

* * * * *